United States Patent [19]
Dreyfus et al.

[11] 3,914,655
[45] Oct. 21, 1975

[54] HIGH BRIGHTNESS ION SOURCE

[75] Inventors: Russell Warren Dreyfus, Cross River; Rodney Trevor Hodgson, Somers, both of N.Y.

[73] Assignee: International Business Machines Corporation, Armonk, N.Y.

[22] Filed: June 28, 1973

[21] Appl. No.: 374,457

[52] U.S. Cl. .................................. 317/4; 250/423
[51] Int. Cl. ............................................. H01j 37/08
[58] Field of Search ............... 317/4; 250/423, 424; 331/94.5 A; 73/432 L

[56] References Cited
UNITED STATES PATENTS

| | | |
|---|---|---|
| 3,443,087 | 5/1969 | Robieux et al. .................... 250/424 |
| 3,444,377 | 5/1969 | Hora et al. ......................... 331/94.5 A |
| 3,756,344 | 9/1973 | Daiber et al. ...................... 331/94.5 A |
| 3,772,519 | 11/1973 | Levy et al. .......................... 250/423 |

*Primary Examiner*—L. T. Hix
*Attorney, Agent, or Firm*—George Baron

[57] ABSTRACT

A high brightness ion beam is obtainable by using lasers to excite atoms or molecules from the ground state to an ionized state in increments, rather than in one step. The spectroscopic resonances of the atom or molecule are used so that relatively long wavelength, low power lasers can be used to obtain such ion beam.

4 Claims, 3 Drawing Figures

HIGH BRIGHTNESS ION SOURCE

BACKGROUND OF THE INVENTION

Ion sources are employed in many aspects of industry, either for test purposes or for injection into materials to modify the characteristics of such materials. In the ion bombardment of semiconductors, for example, the amount and depth of penetration of ions of certain metals will control the electrical characteristics of such bombarded semiconductors.

Elements can be made to ionize by applying various forms of energy to them. Heat, ultraviolet light, x-rays and rays from radioactive substances may force the formation of small numbers of ions by causing electrons to be driven out of atoms or molecules. Gaseous elements may become ionized when a high tension current is sent through a partially evacuated tube. If the ions, so formed, are allowed to recombine, energy in the form of light is emitted. Resolution of light emitted into different wavelengths produces spectra, characteristic of the atoms, molecules and ions of such gaseous elements.

In the present invention, an ion beam is sought that has much greater current density than those of the same divergence produced in the manner set forth in some of the prior art devices. Such a source is referred to as a high brightness ion source.

An example of the use of a powerful laser beam for generating ions which may be in the form of a high brightness beam is given in U.S. Pat. No. 3,478,204 which issued on Nov. 11, 1969 wherein the laser source must produce a field strength of an intensity of at least $10^8$ volts per centimeter which is sufficient to cause autoionization of gas atoms and molecules by a process called "multiphoton absorption." Atoms and molecules are ionized by the extremely high electric field produced in a localized region by the use of a focused laser beam. The electrons may be thought of as being "torn out" of their orbits by the field. A short focal length lens focuses a powerful laser beam to a spot that is about 0.001 cm in diameter in a gas of the material to be ionized. Such a small spot would have an energy density in the order of $10^{15}$ watts/cm$^2$, giving an electric field strength of the order of $10^9$ volts per cm.

One undesirable feature of the laser generated ions of the prior art is that very powerful lasers are needed. Such lasers are difficult to manufacture, are very expensive and usually require frequent servicing.

In the present invention, instead of relying on multiphoton ionization to ionize atoms in a gas or vapor, one or more tunable lasers, such as c.w. or pulsed dye lasers, are used to saturate atomic or molecular transitions. When an atomic or molecular transition is saturated, the number density of atoms or molecules in the higher energy state is approximately equal (ignoring degeneracy factors for the moment) to the number density in the lower energy state. Tunable dye lasers have outputs in the visible range and have sufficient output power to saturate the desired atomic or molecular transitions. Once the tunable lasers have excited the molecules of a material, such as a gaseous vapor, to high lying energy states, then less power is required to generate ions by multiphoton or single photon absorption and longer wavelengths are required to excite the molecules to an autoionizing level. Specifically the present invention teaches how to decrease the required power by 1,000 million times.

Consequently, it is an object of this invention to provide a high brightness ion source using tunable lasers.

It is yet another object to achieve a high brightness ion source using tunable lasers in the visible range. It is yet another object to achieve a high brightness ion source using lasers with much less than $10^8$ watts in a beam cross section of the order of one square centimeter.

Yet another object of this invention is to achieve a high brightness ion source using a gaseous vapor as the medium to be ionized by the laser beams.

Figure 1:
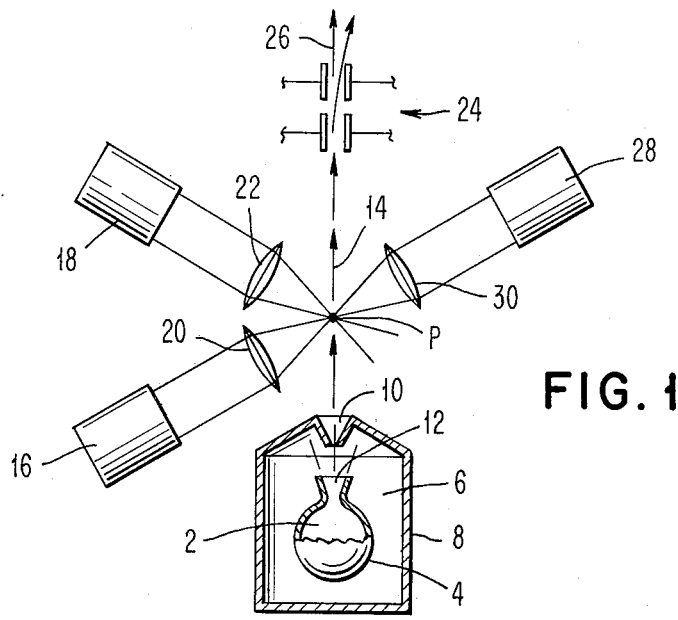
FIG. 1 is a schematic representation of the preferred embodiment of the invention.

The embodiment of the invention shown in FIG. 1 comprises a source of gaseous sodium 2, heated by an oven (not shown) to a temperature of about 500°C. The sodium pressure within region 4 is surrounded by a low pressure region 6 within a housing 8, the latter having an aperture 10 that is close to and substantially coaxial with aperture 12 of the high pressure region 4. Such openings 12 and 10 serve as a supersonic nozzle and as a skimmer, respectively, cutting down the divergence of the beam of sodium atoms emanating as a supersonic beam from aperture 10.

Beams from two dye lasers, 16 and 18, are focused to intersect each other and the sodium beam at a point P. Laser sources 16 and 18 are tunable dye lasers, using Rhodamine 6G as the active material, emitting at 5,895A and 5,682A, respectively. Lenses 20 and 22 focus the beams from respective laser sources 16 and 18 at a point P in the path 14 of the sodium atoms, P being chosen to be the highest density region of the atomic beam. Both laser sources 16 and 18 may be operated c.w. or pulsed. Since dye lasers can operate at more than one wavelength (or a band of wavelengths) at a given instant, both requisite wavelengths could be produced by one laser; although a plurality of lasers will be utilized for clarity.

Figure 2:
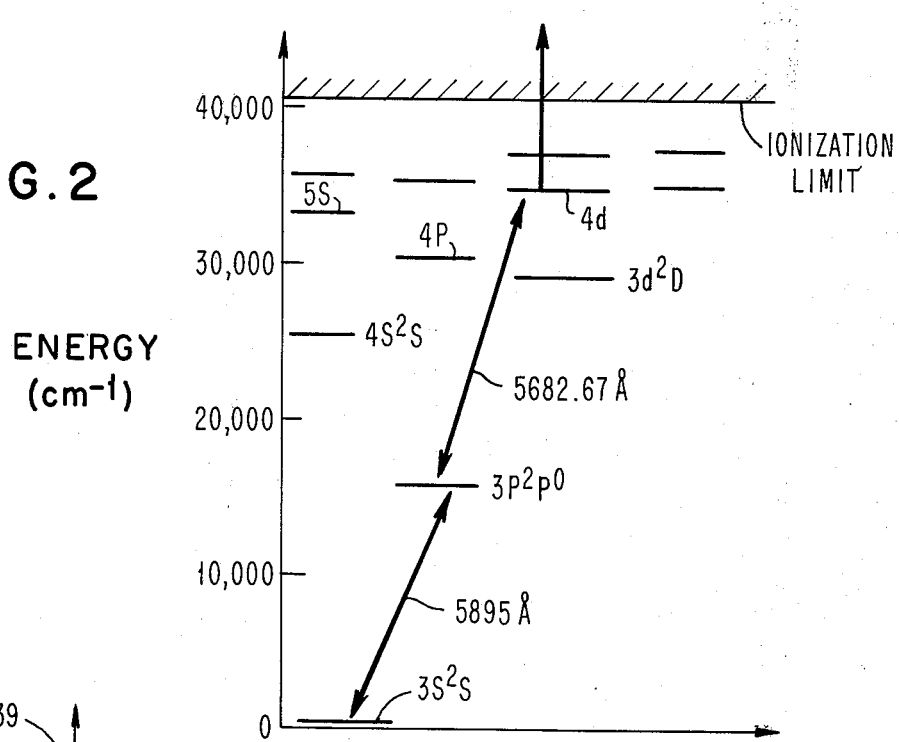
FIG. 2 is an energy diagram of the sodium atom, the latter being chosen as an example of an element that can be ionized by the invention of FIG. 1.

As seen in the energy diagram of FIG. 2, laser source 16 irradiates the gaseous beam of sodium atoms with a frequency of 5,895A and excites the atoms from their 3s ground state to their excited 3p state. The laser beam from source 16 needs to have sufficient power so that the transition from ground state 3s to excited state 3p is nearly saturated. The laser source 18 emits at a frequency of 5682A, which excites the excited 3p state of the sodium atom to a second excited state, namely, the 4d level. The 4d level of the doubly excited sodium atoms is only about 7,000 cm$^{-1}$ from the ionization limit for sodium, so either the 5,895A photos or the 5,682A photons have sufficient energy to photoionize the sodium atoms. When the atomic sodium beam leaves point P after being pumped by both laser sources 16 and 18, it contains ions and electrons. Conventional accelerating electrodes 24 accelerate the ions and remove the electrons from beam 14 so that a beam 26 of (sodium) ions and remaining neutral sodium atoms results. The ions can be separated from the neutral particles by conventional electrostatic or magnetic deflection schemes.

The total time needed to saturate the $3s$–$3p$ transition and the $3p$–$4d$ transition is of the order of $10^{-13}$ seconds if 100 milliwatt laser beams of 5,895A and 5,682A are focused at point P in the path of the atomic sodium beam on an area about $10^{-8}$ cm². All three states therefore will be saturated and there will be nearly equal populations in each of the three states. The sodium atoms in the $4d$ state will have an ionization cross section of the order $10^{-17}$ cm², and when they are subjected to $10^7$ watts/cm² of light in the wavelength range 5,000 to 6,000A they will be photoionized in $3 \times 10^{-9}$ seconds.

Typical velocities for sodium atoms in a supersonic beam are of the order of $5 \times 10^4$ cm/sec. The time taken for an atom to pass through a focal spot of $10^{-4}$ cm diameter is then $2 \times 10^{-9}$ sec, and most of the beam atoms could be ionized. Continuous dye laser powers of 5 watts have been produced, so there would be no difficulty in making a 100m watt or higher power dye laser.

The focusing and intersection of the beams to a point with an error of $10^{-4}$ cm could be simply checked by monitoring the 5,895A and 5,682A resonance fluorescence. The 5,895A fluorescence maximum would indicate that the center of the beam was reached, while the 5,682A fluorescence maximum would indicate maximum overlap of the two tunable dye laser beams.

In FIG. 1, a third laser source 28 and its corresponding lens 30 for focusing the beam emanating from such laser source 28 at point P are shown. This is so because if the beam 14, be it atomic or molecular, is excited to two different excited states, one higher than the other, the higher state may still require more energy to reach an autoionizing level than can be provided by lasers 16 and 18. Consequently, a third laser of the proper frequency and adequate power is needed to pump the second excited state to yet a third excited state so that one of the three lasers being focused at point P can photoionize those particles in the highest excited state to produce the desired ions.

Figure 3:
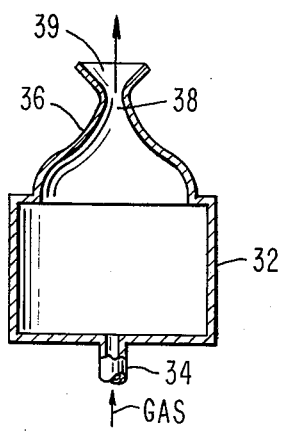
FIG. 3 is a schematic cross-sectional view of a gas source suitable for use with the apparatus of FIG. 1.

The supersonic nozzle shown in FIG. 3 is a well known method for obtaining a high speed jet of gaseous atoms or molecules that have a low Doppler width. Its operation is described in U.S. Pat. No. 3,558,877 issued on Jan. 26, 1971 to Jerome Pressman. The supersonic gas source is obtained by employing a plenum chamber 32 into which sodium gas is introduced through port 34. Chamber 32 terminates into nozzle 36 whose throat aperture 38 is in line with aperture 12 of FIG. 1. By suitably adjusting the pressures within chamber 32 and low pressure chamber 6, the velocity of the atomic or molecular beam can be made to be equal to the speed of sound in the throat aperture 38. The gas continues to expand and cool and leaves the exit aperture 39 with a speed greater than sound speed.

The brightness of an ion source equals the number of ions generated per sec, per sq cm, per steradian. By using lasers that can be focused at very small spots such as $10^{-8}$ cm² and which can saturate transition levels and ionize molecules in a supersonic molecular beam, one can produce a high current beam of ions with a very small beam cross section. The speed of the ions transverse to the beam divided by the speed parallel to the beam gives a measure of the divergence (number of steradians), and for a supersonic beam this divergence will be quite low. However, the generation need not require exceedingly powerful lasers having frequencies requiring expensive or esoteric lasers to generate them.

The invention can be extended to include many other gaseous elements than sodium and can be applied to many molecular and ion beams as well. What is needed is to know the energy diagram of the chosen material and choose laser beams that can reach saturation levels quickly, using conventionally available tunable lasers. For atoms and ions, reference can be had to Charlotte Noore's tables of energy levels (NBS Circular 467). The frequency of the first laser is chosen to correspond to a resonance transition from a ground state to an excited state. The second laser is chosen so that its frequency will excite the excited state produced by the first laser to a still higher energy level. This process is repeated until the ionization threshold is reached. The use of a number of tunable lasers to produce different frequency light beams not only allows for low power, low frequency lasers to be used, but also allows for a wider spectrum of materials to be ionized into beams having high brightness.

What is claimed is:

1. A generator of a high quality, high brightness ion source comprising a stream of particles, consisting of atoms, molecules or ions,
    a plurality of laser beams intersecting said stream of particles in a region in said ensemble of particles, one of said lasers being equal to a resonant frequency of the particles in said ensemble so as to excite them to an excited state,
    the frequency of a second laser being equal to a frequency that will excite said excited state of the particles to a second excited state of a higher energy than said first excited state, and
    the frequency of any other focused laser beam in said plurality of laser beams being chosen to excite each previously excited state to a higher energy state until the ionization limit of the ensemble of particles is reached, all such excitations not interfering with the direction of said stream of particles when such ionization limit is reached, and
    means for separating such created high quality, high brightness ions from any other particles in said stream for application to any utilization device requiring such bright ion source.

2. An ion generator comprising a generator of a stream of atoms of vaporized sodium,
    a plurality of laser beams intersecting said stream of atoms,
    the frequency of one of said laser beams being equal to a resonant frequency of the atoms so as to excite them to an excited state,
    the frequency of a second laser beam being equal to a frequency that excites said excited state of atoms to a second excited state having a higher energy than said first excited state,
    the frequency of any other laser beam in said plurality of laser beams being chosen to excite each said previously excited state to a higher energy state until the ionization limit of the stream of sodium atoms is reached, and
    means for extracting said beam of sodium ions from said stream.

3. The ion generator of claim 2 wherein two laser beams that intersect said stream of sodium atoms have wavelengths of 5,895A and 5,682A, respectively.

4. The ion generator of claim 3 including lenses between said laser beams and said stream of sodium atoms so as to focus the output beams of said lasers at a point in said stream.

* * * * *